Nov. 20, 1962  C. A. HAYNIE  3,064,842
SELF-LOADING VEHICLE
Filed Feb. 16, 1959  2 Sheets-Sheet 1
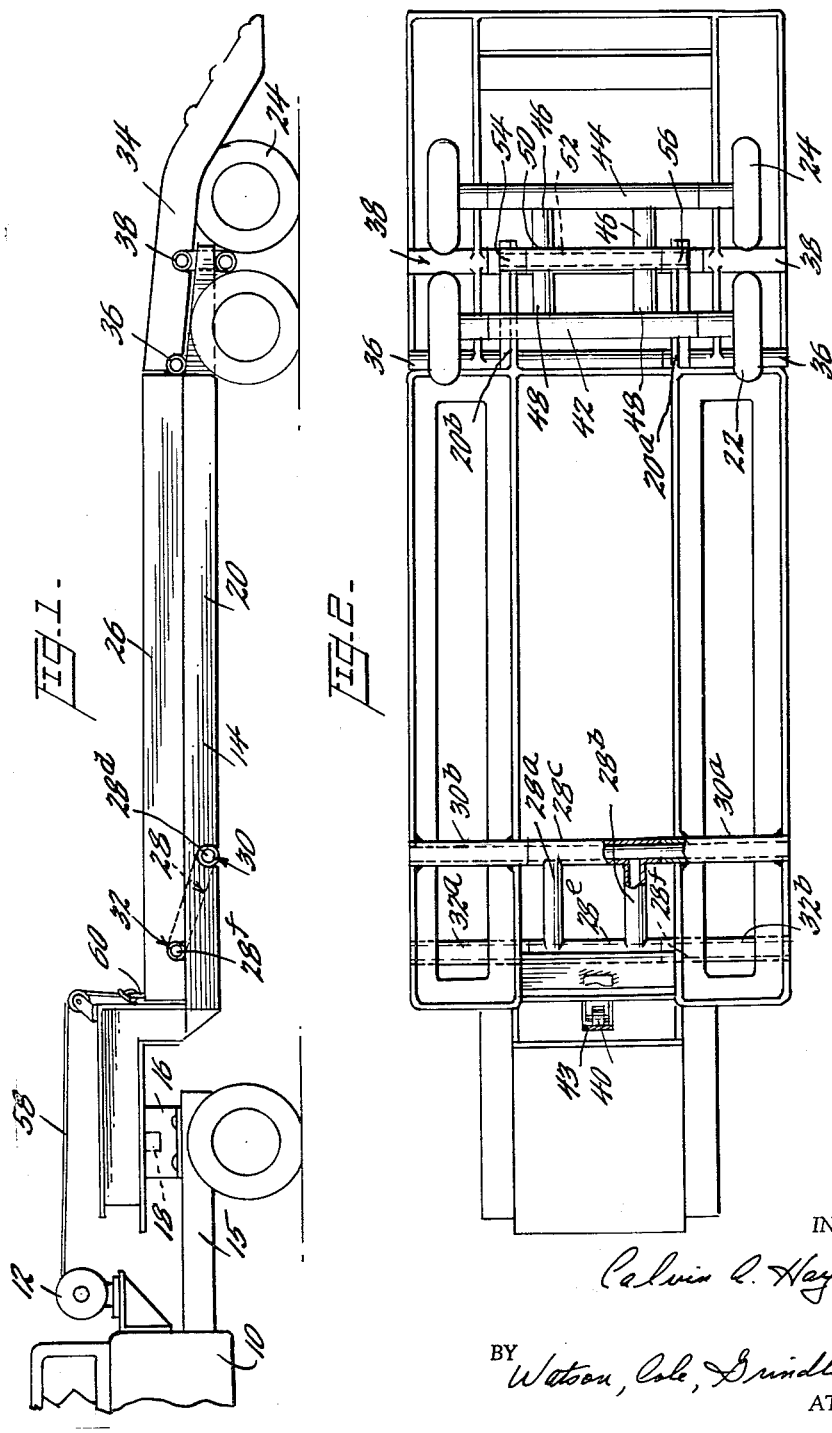
INVENTOR
Calvin A. Haynie
BY Watson, Cole, Grindle & Watson
ATTORNEYS

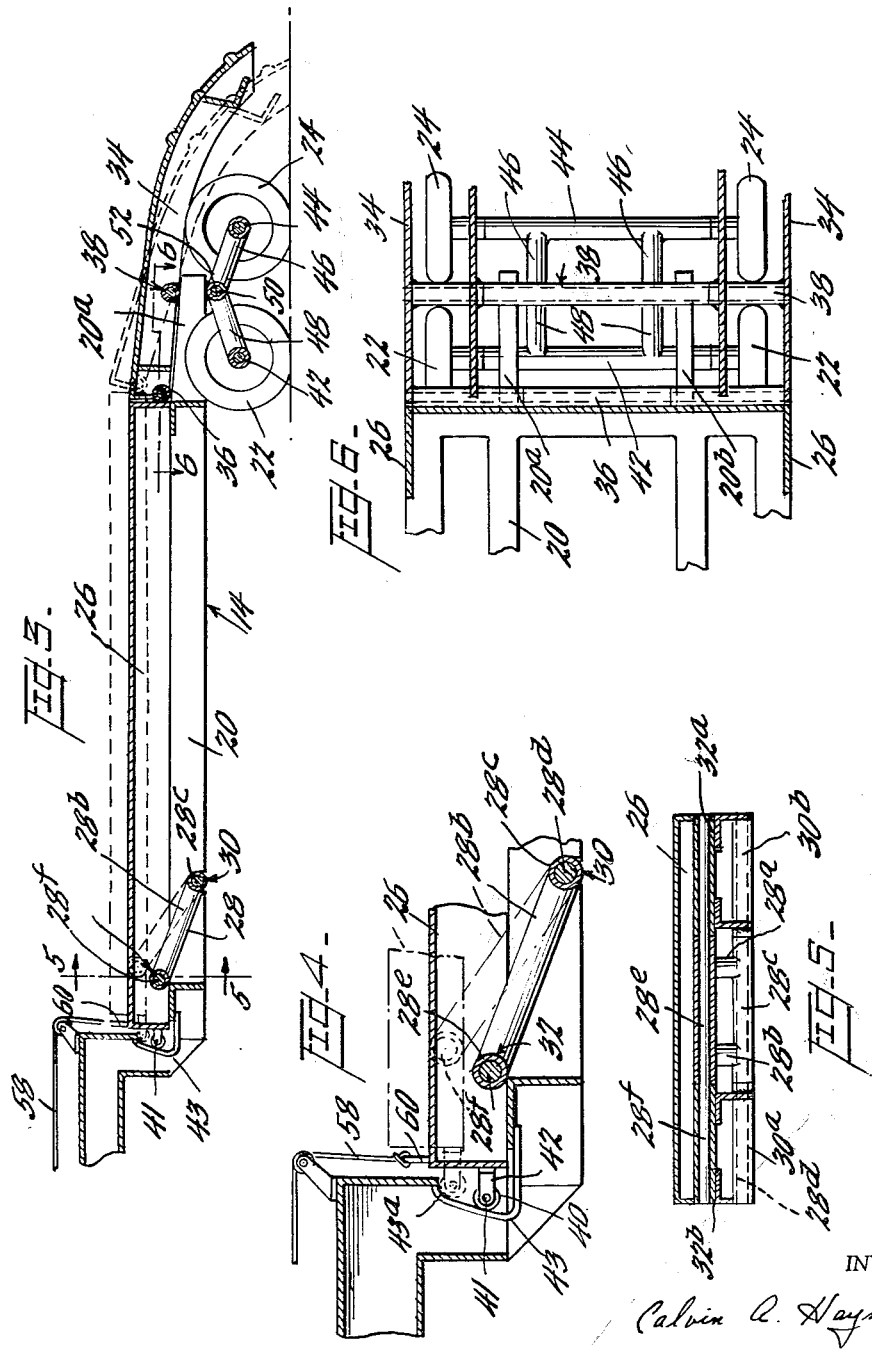

United States Patent Office 3,064,842
Patented Nov. 20, 1962

3,064,842
SELF-LOADING VEHICLE
Calvin A. Haynie, Minden, La., assignor of one-half to Henry G. Hobbs
Filed Feb. 16, 1959, Ser. No. 793,311
9 Claims. (Cl. 214—505)

This invention relates to improvements in vehicles and more particularly to self-loading vehicles for use to carry heavy equipment such as bulldozers, and the like, which are designed to facilitate the loading and unloading of such equipment.

The loading of heavy track or wheeled vehicles on a flatbed type trailer must be executed very carefully and, as presently accomplished, is time-consuming and requires a considerable amount of manual labor. Some trailers or flatbeds are formed with ramps at the rear which may or may not be detachable. If they are detachable, the pieces are very heavy and require two or more persons for handling each time they are positioned for movement of the equipment on or off the trailer and each time they are removed for travel of the trailer. Numerous types of these devices are known which are adapted to self-loading by means of pivoting the chassis so that the rear end of the trailer pivots to a position to define an inclined ramp. However, in each instance the entire chassis pivots and, accordingly, it is necessary that the pivot point be strongly reinforced and that a suitable jack or lifting means be provided at the pivot point. Further, these devices are very complex in construction and are thus very expensive.

Accordingly, it is an object of this invention to provide an improved trailer which is adapted to be prepared for loading or unloading by means of a single operator.

It is another object of this invention to provide an improved trailer structure which is simple in construction and easy to operate into a loading or unloading position.

It is another object of this invention to provide a trailer structure which will greatly facilitate loading and may be actuated by standard equipment from the tractor unit.

Briefly, in accordance with aspects of this invention, a gooseneck type flatbed trailer is constructed with a standard type rigid frame or chassis and has a movable bed or platform structure pivotally mounted on the chassis. This pivotally mounted platform includes a major or principal bed or platform member and a tail gate or end member hingedly connected to the platform member. Advantageously, the bed or platform member is pivoted relative to the chassis by a parallelogram type movement. Actuation of the pivot movement is controlled by means of a winch conveniently located on the tractor unit and this winch is connected to one end of the platform member by means of a cable passed over a pulley. Advantageously, the tail or end member is pivotally mounted above the rear wheel assembly to define one pivot arm of the parallelogram movement. The pivot fulcrum of the tail or end member may advantageously be in a plane mid-way between the sets of rear wheels.

The other pivot arm of the parallelogram type movement is pivotally connected to the platform member adjacent the forward end of the member and is pivotally connected to the trailer chassis rearwardly of the platform connection. Advantageously, the tail or end platform member extends a greater distance beyond the tail pivot than the distance from the tail pivot to the hinge connection between the tail member and the principal platform member. Also, advantageously, the tail or end member is curved toward its rearward end to reduce the movement required of the parallelogram type movement to bring the tail into engagement with the ground.

When it is desired to operate the self-loading trailer into a position for loading, the operator merely actuates the winch which pulls the cable connected to the front end of the platform member lifting the platform member. Movement of the cable causes the platform member to pivot about its pivot points. As the platform member moves upwardly, the tail member, which is hingedly connected to the platform member, pivots about a line parallel to the rear end of the chassis such that the end of the tail member moves into engagement with the ground. Advantageously, the tail pivot is mounted near the rear end of the chassis so that the terminal portion of the tail may swing through a relatively large arc, if necessary, to engage the ground. Advantageously, the linkage to the main platform member defined by the front pivot arm and the tail is such that only a limited vertical movement of the platform member is required to move the end of the tail member into engagement with the ground. Also, advantageously, there is located at the front of the trailer bed a roller bearing which engages an arcuate track on the chassis to facilitate pivotal movement of the platform member and also to limit the movement of the platform member by engaging a stop on the trailer chassis.

In accordance with still other aspects of this invention, the trailer platform is pivotally mounted with respect to the trailer chassis in such a manner that when the vehicle, such as a bulldozer, moves up the ramp formed by the pivotal movement of the tail, the weight of the bulldozer aids in the movement of the platform to its normal position.

Accordingly, it is a feature of this invention to provide a self-loading type trailer with a parallelogram type movement, one link of which is the loading ramp or tail member of the trailer.

It is another feature of this invention to provide a gooseneck type trailer with a parallelogram movement, one arm of which extends beyond the parallelogram and pivots to a position with respect to a rigid chassis to define a loading ramp.

It is another feature of this invention to provide a flatbed type trailer with a pair of parallel positioned rear axles and to pivot the end member of the platform about an axis intermediate these two parallel axles.

It is another feature of this invention to actuate a winch mounted on a tractor and connected through a cable to the bed of the trailer to pivot one platform member to cause the tail which is hingedly connected to the platform member to thereby define a loading ramp.

These and various other objects and features of this invention will be more clearly understood from a reading of the detailed description in conjunction with the drawings in which:

FIGURE 1 is a side view in elevation of one illustrative embodiment of this invention;

FIGURE 2 is a plan view of the bottom of the trailer of FIGURE 1;

FIGURE 3 is a partial view in elevation, partly in section, of FIGURE 1 showing, in solid lines, the normal position of the platform member and tail and showing, in dotted lines, the loading position;

FIGURE 4 is an enlarged view of the left-hand side of FIGURE 3 showing detailed movement of the front end of the platform;

FIGURE 5 is a view in elevation, partly in section, taken along the lines 5—5 of FIGURE 3; and FIGURE 6 is a detailed plan view, partly in section, of the rear wheel assembly taken along the line 6—6 of FIGURE 3.

Referring now to FIGURE 1, there is depicted a tractor 10 such as normally used to pull trailers of the lowboy or gooseneck type. A winch 12 is mounted on the rear of tractor 10, which winch may be driven by the tractor motor through convenient gears, not shown, and is used to actuate the self-loading trailer in a manner which will be subsequently explained. A trailer 14 is connected to the tractor 10 by means of the usual type of engagement afforded by a platform 16 on the chassis 15 of tractor 10 and a pin 18 secured to the trailer 14 which engages an aperture in the platform 16. The trailer 14 includes a rigid chassis 20 which is of the gooseneck type. The rear end of chassis 20 is supported by tandem wheels, such as 22, 24.

The loading platform of the trailer advantageously includes a parallelogram type movement, the upper and lower planes of which are defined by the platform 26 and the chassis 20, respectively. Connected to this platform at the forward end of the platform member is a link or arm 28 which pivots about a bearing 30 secured to the chassis 20. Pivot arm 28 is mounted in a bearing 32 mounted in the lower portion of platform 26. The tail or rear portion of the trailer bed is defined by an arcuate or angular member 34, a portion of which defines one of the parallelogram links or arms. Advantageously, member 34 is secured to members 26 by means of a hinge 36. Also, advantageously, member 34 rotates about a pivot point defined by a bearing 38. Similarly, the link or arm 28 rotates about a bearing 32 mounted in the lower portion of platform 26. The linkage system 28 is best seen in FIGURES 2 and 5. Linkage 28 includes a pair of pipe members 28a, 28b, which may be riveted or secured in any convenient fashion to a perpendicular pipe member 28c. Advantageously, member 28c has a solid shaft or axle 28d therethrough which engages bearings 30a and 30b. The opposite end of the pivot member 28 is similarly constructed and includes a pipe member 28 pivoted or otherwise secured to the members 28a and 28b. A coaxial member 28f, which may be solid or hollow, is mounted within member 28e and rotates relative to members 32a and 32b. A roller member 40 is rotatably mounted on a shaft 41 supported in U-shaped housing 42. Roller 40 engages an arcuate track member 43 secured to the chassis 20 to improve the movement of member 26. Track member 43 also serves to limit the movement of member 26 by defining a stop 43a.

As shown in FIGURE 2, the rear end of the chassis 20 is supported by two sets of wheels 22 and 24, which are rotatably mounted on parallel axles 42 and 44. Advantageously, the axles are secured to each other by arms 46 and 48 which are secured to a suitable cylindrical member 50. Advantageously, the member 50 encircles a shaft 52 which is secured to the frame 20 by suitable means such as by bearings 54 and 56. Although only two wheels are shown on the opposite ends of the shafts, or axles 42, 44, it is understood that in this type of trailer it is often necessary to employ a larger number of wheels.

As best shown in FIGURE 3, the tail or end platform member 34 pivots about bearing 38 in response to vertical movement of platform 26 transmitted through pivot of hinge 36. Advantageously, the pivot bearing 38 is coupled to the tail 34 at a point closer to the front end of tail 34 than to the rear end. Accordingly, a relatively limited vertical movement of the forward end of the tail 34 is accompanied by a relatively extensive movement of the rear end of tail 34, as best seen in FIGURE 3.

The winch 12 is connected by means of cable 58 to an eye 60 mounted on platform member 26.

When it is desired to operate the trailer for loading or unloading, the operator actuates the winch to reel in the cable 58. This cable movement lifts the platform member 26, causing it to pivot by its pivot arms 28 and 34. Since pivot arm 34 is the tail member, the rear end moves into engagement with the ground. When the vehicle to be loaded passes beyond hinge or pivot 36, the weight of the loaded vehicle aids in the movement of platform member 26 to its initial position. It is only necessary for the operator to slowly release the brake on the winch 12 and the tail rotates out of engagement with the ground.

While I have shown and described various embodiments of my invention, it is understood that the principles thereof may be extended to many and varied types of machines and apparatus. The invention, therefore, is not to be limited to the details illustrated and described herein.

What is claimed is:

1. A trailer of the gooseneck type comprising a chassis, a platform member on said chassis, a first pivot member pivotally connected to said chassis at a point intermediate the ends of said chassis and to said platform member at a point adjacent the forward end of said platform member and a second pivot member pivotally connected to said platform member and to said chassis and having one end extending beyond said chassis to define a loading ramp when said platform member is pivoted relative to said chassis, said second pivot member being connected to said chassis at a point intermediate the ends of said pivot member and connected to said chassis at a point adjacent the end thereof.

2. A trailer of the gooseneck type comprising a rigid chassis, a platform member supported on said chassis, a first pivot member pivotally connected to said platform member adjacent one end of said platform member and pivotally connected to said chassis at a point rearwardly of said one end of said platform member and a second pivot member pivotally connected to said chassis at a point intermediate the ends of said pivot member and to said platform member at one end of said second pivot member, said second pivot member extending beyond its connection to said chassis to rotate relative to said chassis and define a loading ramp when said platform member is raised relative to said chassis.

3. A trailer of the gooseneck type according to claim 2 wherein said second pivot member extends rearwardly of said chassis beyond its pivot point a distance greater than the distance from its pivot point to its connection with said platform member whereby a limited upward movement of said platform member is accompanied by a greater downward movement of the rearward end of said second pivot member as it moves into engagement with the ground.

4. A trailer of the flatbed type having a chassis, a first and a second platform member and a pivot arm, all pivotally connected to define a parallelogram type movement, said first pivot arm being pivotally connected to said chassis at a point intermediate the ends of said chassis and connected to said first platform member at a point forward of said intermediate point on said chassis, said second platform member being pivotally connected to said chassis at a point adjacent the rearward end of said chassis, and said second platform member being pivotally connected to said chassis at a point intermediate the ends of said second platform member, said second platform member being connected to said first platform member at the ends of said second platform member and said first platform member, said second platform member pivoting to a position defining a loading ramp when said first platform member is pivoted relative to said chassis.

5. A trailer according to claim 4 wherein said second platform member extends a greater distance beyond said chassis pivot point rearwardly of the chassis than the distance from its chassis pivot point to its point of connected to said first platform member.

6. A tractor-trailer combination having a configuration to facilitate the loading of heavy vehicles thereon comprising a tractor having winch means a trailer having a rigid chassis connected to said tractor and having wheels on the end thereof remote from said tractor, a first and a second platform member supported by said chassis and hingedly connected together, means pivotally connected to the forward end of said first platform member and to said chassis at a point rearwardly of said forward end of said first platform member and means pivotally connecting said second platform member to said chassis at a point intermediate said second platform member, said last mentioned means being connected to said chassis at the rearward end of said chassis means connecting said winch means to the forward end of said first platform member whereby operation of said winch means causes said second platform member to pivot into a position to define a loading ramp when said winch moves said first platform member relative to said chassis.

7. A tractor-trailer combination according to claim 5 further including roller means secured to the forward end of said first platform member and track means secured to said chassis in a position to engage said roller means to assist in guiding the pivotal movement of said first platform member, said track means including stop means for limiting the movement of said roller means.

8. A tractor-trailer combination according to claim 6 wherein the pivotal connection to said second platform member is positioned nearer to the forward end of said platform member than to the rearward end of said second platform member whereby a limited movement of the forward end of said second platform member is accompanied by a greater movement of the rearward end of said second platform member.

9. A tractor-trailer combination according to claim 6 wherein said second platform member has a surface which slopes downwardly toward the rear end thereof to reduce the movement of the rear end of said second platform member required to obtain contact with the ground.

References Cited in the file of this patent

UNITED STATES PATENTS

| | | |
|---|---|---|
| 1,427,189 | Bourgeois | Aug. 29, 1922 |
| 2,789,714 | Norris | Apr. 23, 1957 |
| 2,797,833 | Cash | July 2, 1957 |